(12) United States Patent
Kuo

(10) Patent No.: US 7,189,584 B2
(45) Date of Patent: Mar. 13, 2007

(54) FABRICATION ALIGNMENT TECHNIQUE FOR LIGHT GUIDE SCREEN

(75) Inventor: Huei Pei Kuo, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/115,723

(22) Filed: Apr. 27, 2005

(65) Prior Publication Data

US 2006/0246608 A1    Nov. 2, 2006

(51) Int. Cl.
*H01L 21/00* (2006.01)
(52) U.S. Cl. .............. 438/7; 438/16; 257/E31.127; 257/E21.53; 385/14
(58) Field of Classification Search ............ 438/7, 438/16, 30; 385/14; 257/E31.127, E21.53
See application file for complete search history.

(56) References Cited

U.S. PATENT DOCUMENTS

| 4,116,739 A | 9/1978 | Glenn |
| 4,929,048 A | 5/1990 | Cuypers |
| 5,911,024 A | 6/1999 | Wallace |
| 6,216,351 B1 * | 4/2001 | Flubacher et al. ............ 42/145 |
| 6,297,888 B1 * | 10/2001 | Noyes et al. ................ 358/1.9 |
| 6,316,281 B1 * | 11/2001 | Lee et al. ..................... 438/31 |
| 6,545,261 B1 | 4/2003 | Blake et al. |
| 6,571,043 B1 | 5/2003 | Lowry et al. |
| 6,778,740 B2 | 8/2004 | Medberry et al. |
| 6,788,855 B2 | 9/2004 | Massey et al. |
| 6,847,766 B2 | 1/2005 | Kim et al. |
| 2003/0161573 A1 * | 8/2003 | Ishida et al. .................. 385/14 |
| 2004/0051872 A1 * | 3/2004 | Blidegn ....................... 356/400 |
| 2004/0240803 A1 * | 12/2004 | Rechberger et al. .......... 385/93 |
| 2005/0141822 A1 * | 6/2005 | Nagai .......................... 385/88 |

* cited by examiner

*Primary Examiner*—Michelle Estrada

(57) ABSTRACT

Provided is a fabrication alignment technique for a light guide screen. A plurality of light guide layers are provided. Each light guide layer includes a plurality of aligned light guides, each light guide having an input end, a midsection and an output end. The light guide layers are physically stacked. The input ends and the output ends are aligned. Vertical misalignment is detected with an optical detection device. In response to the detection of vertical misalignment, at least one light guide layer is horizontally adjusted.

35 Claims, 10 Drawing Sheets

FABRICATION ALIGNMENT TECHNIQUE FOR LIGHT GUIDE SCREEN

RELATED APPLICATIONS

This application is related to commonly owned U.S. patent application Ser. No. 10/698,829, filed on Oct. 31, 2003 and entitled "Light Guide Apparatus For Use In Rear Projection Display Environments", herein incorporated by reference.

FIELD

This invention relates generally to the field of display devices, and more particularly to screens and related hardware employed in rear projection display devices.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs), or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may be difficult and awkward to install and support.

Often, rear projection display devices exhibit average or below average picture quality in certain environments. For example, rear projection displays may be difficult to see when viewed from particular angles within a room setting or when light varies within the environment. Light output and contrast are constant issues in most settings and viewing environments.

Despite advancements in projectors and enhanced lens elements, the lens and reflector design remains generally unchanged and tends to be a limiting factor in both picture quality and overall display system thickness.

A developing variation of rear projection displays utilizes light guides, such as optical fibers, to route an image from an input location to an output location and to magnify the image. Such displays may be referred to as light guide screens (LGSs).

Typically, each pixel of the screen is established by one or more light guides. The image as viewed by an observer is composed of many pixels, each small enough to be nearly visually undesirable, yet collectively providing an image.

Proper alignment of the light guides at the input end and the output end, and relative alignment between the input end and the output end, is therefore an important element in providing an LGS that will be accepted by viewers, for should a shift in alignment occur, the displayed image may be distorted or otherwise corrupted.

Weight, thickness, durability, cost, aesthetic appearance and quality are key considerations for rear projection display systems and display screens. From the manufacturing point of view, cost of production and increased yield are also important.

SUMMARY

This invention provides a fabrication technique for a light guide screen.

In particular and by way of example only, according to an embodiment of the present invention, provided is a fabrication alignment technique for a light guide screen, including: providing a plurality of light guide layers, each layer including; a plurality of aligned light guides, each light guide having an input end, a midsection, and an output end; stacking the light guide layers; vertically aligning the input ends and the output ends; optically detecting vertical misalignment; and adjusting horizontal alignment of at least one light guide layer in response to the detection of vertical misalignment.

DETAILED DESCRIPTION

Figure 1:
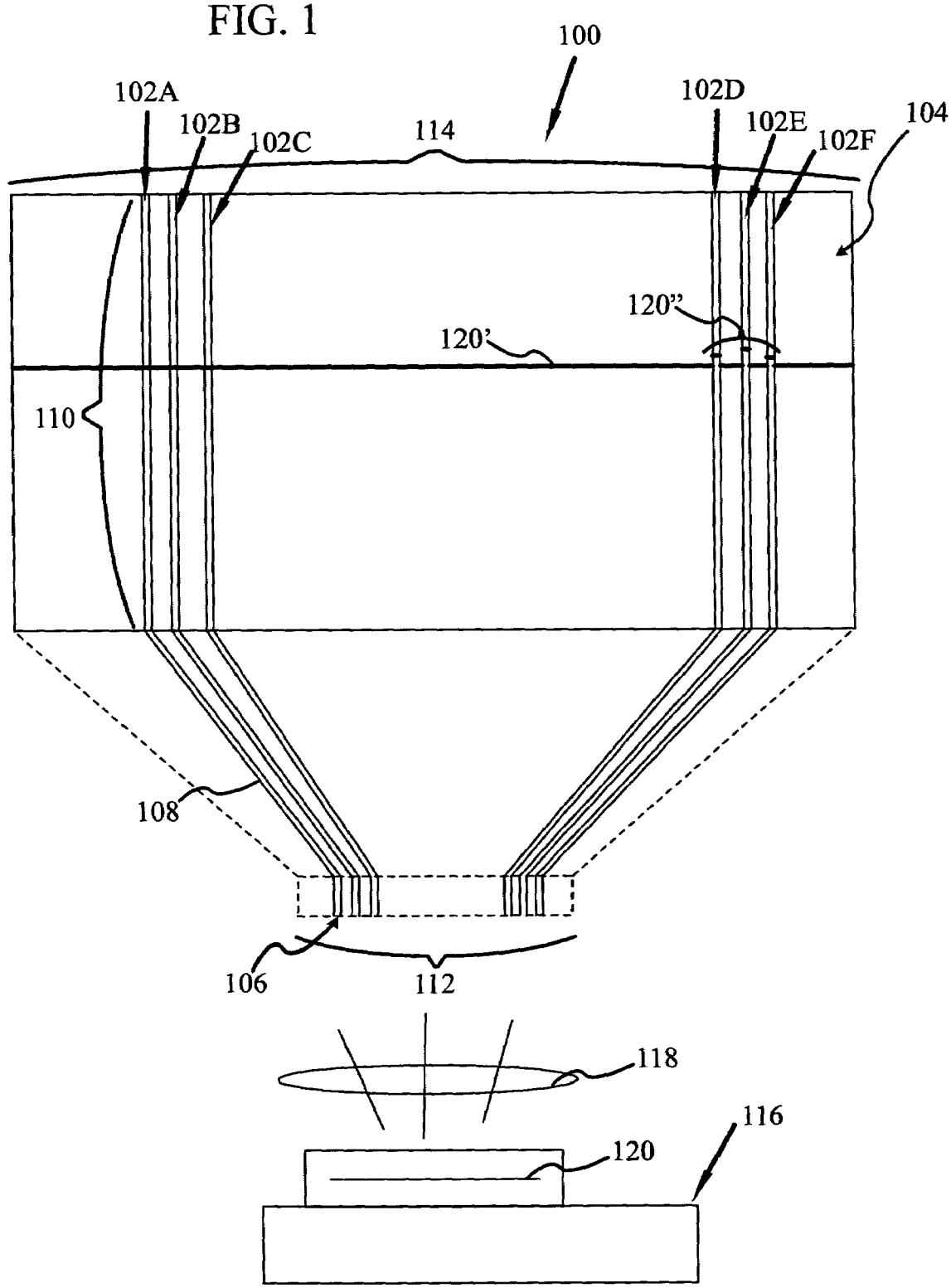
FIG. 1 is a schematic diagram of a light guide screen with misalignment between the light guide layers.

Before proceeding with the detailed description, it is to be appreciated that the present teaching is by way of example, not by limitation. The concepts herein are not limited to use or application with a specific light guide screen or method of making such a light guide screen. Thus, although the instrumentalities described herein are for the convenience of explanation, shown and described with respect to exemplary embodiments, it will be appreciated that the principles herein may be equally applied in other types of light guide ribbons and/or light guide screen display systems.

Referring now to the drawings, the provided figures conceptually illustrate at least one method of a fabrication alignment technique for a light guide screen. It will be appreciated that the described process need not be performed in the order in which it is herein described, but that this description is merely exemplary of one preferred method of performing the fabrication alignment technique for a light guide screen. In addition, it is understood and appreciated that the scale of the components and features illustrated in the Figures has been exaggerated to facilitate ease of discussion and illustration.

In FIG. 1, there is shown a portion of a light guide screen display 100 (herein after, "LGS" 100). In at lest one embodiment, the LGS 100 has a plurality of aligned light guide layers 102 (shown as light guide layers 102A~C and 102D~F) providing a viewing surface 104. Each light guide layer 102 provides an input location 106, a midsection 108 and an output location 110. In at least one embodiment, each light guide layer 102 is structured and arranged as a magnifying light guide layer 102. Whereas FIG. 1 illustrates six light guide layers 102A~F, divided as two groups for ease of discussion and introduction of the elements, FIG. 9 may be referred to as a more complete rendering of the LGS 100 illustrated with a plurality of light guide layers 102.

As shown, in at least one embodiment, each light guide layer 102 is a continuous vertical slice across the viewing surface 104 of LGS 100. In an alternative configuration (not shown), each light guide layer 102 is a continuous horizontal slice across the viewing surface 104 of LGS 100. In at least one embodiment, input locations 106 of each light guide layer 102 collectively provide input face 112. Output locations 110 of each light guide layer 102 collectively provide output face 114.

An image (such as line 120) is projected upon input face 112 by image source 116 proximate to input face 112. A lens 118 may optically couple the at least one image source 116 to the input face 116, or the lens 118 may be an integral part of image source 116.

Image source 116 may be any device capable of providing an projected image, such as, for example, a projector. Image source 116 is not limited simply to this example, and may include combinations of devices. For example, multiple light/image sources (such as red, green and blue illuminated liquid crystal light valves) may be used as well. In at least one embodiment, the image focused upon the input face 112 is expanded to appear upon the viewing surface 104.

To effectively establish the viewing surface 104, it is important that the light guide layer 102 be properly aligned. More specifically, and as further described below, the input locations 106 should be properly aligned and the output locations 110 should be properly aligned. If either or both are misaligned with respect to one another, it is likely that the resulting image upon the viewing surface 104 will be distorted and/or unacceptable to viewers.

As is shown, light guide layers 102A~C are properly aligned with respect to each other so as to establish continuous horizontal image 120'. In contrast, light guide layers 102D~F are slightly misaligned such that horizontal image 120' is disrupted, appearing as horizontal image 120". It is this disruption that is advantageously avoided by at least one fabrication technique as explained below.

Figure 2:
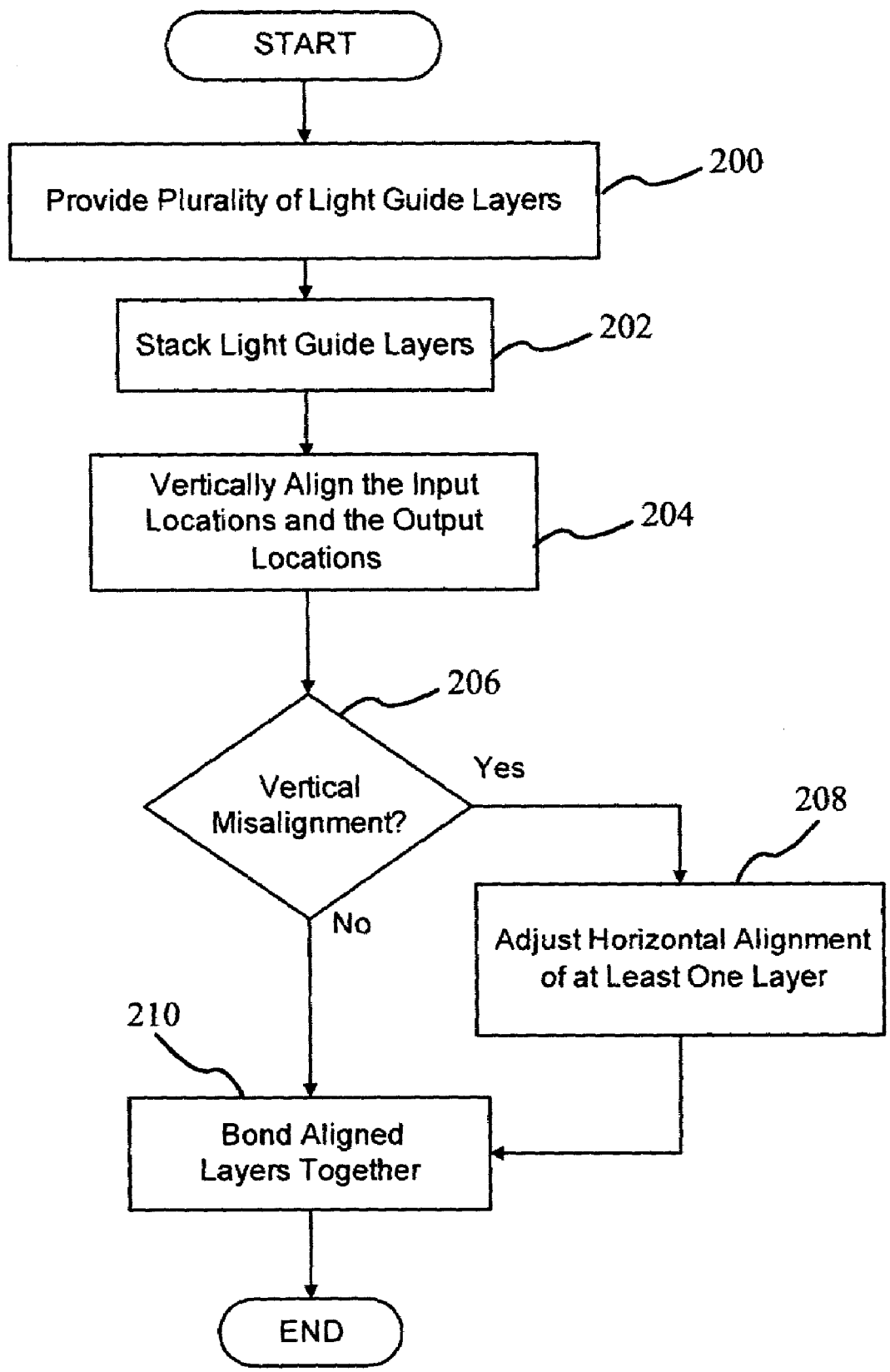
FIG. 2 is a high-level flowchart of a fabrication alignment technique for a light guide screen in accordance with an embodiment.

FIG. 2 provides a high-level overview of an embodiment of a fabrication alignment technique for an LGS 100 as shown in assembled form in FIG. 1. In at least one embodiment, the fabrication process may be summarized as follows. The fabrication process may commence by providing a plurality of light guide layers, block 200. Each light guide layer 102 has an input location 106, a midsection 108 and an output location 110 (see FIG. 1).

The provided light guide layers 102 are stacked, block 202. The stacked light guide layers 102 are vertically aligned. Specifically, the input locations are vertically aligned and the output locations are vertically aligned, block 204. Misalignment between the stacked light guide layers 102 is then detected, decision block 206. In response to the detection of misalignment between the light guide layers 102, horizontal alignment of at least one light guide layer 102 is performed, block 208. The aligned light guide layers 102 are then bonded together, block 210. It is understood and appreciated that in at least one embodiment, the stacking process is performed normal to the plane of the light guide layer 102. In other words, the light guide layers are stacked along a line perpendicular to the plane of the first light guide layer 102.

Figure 3:
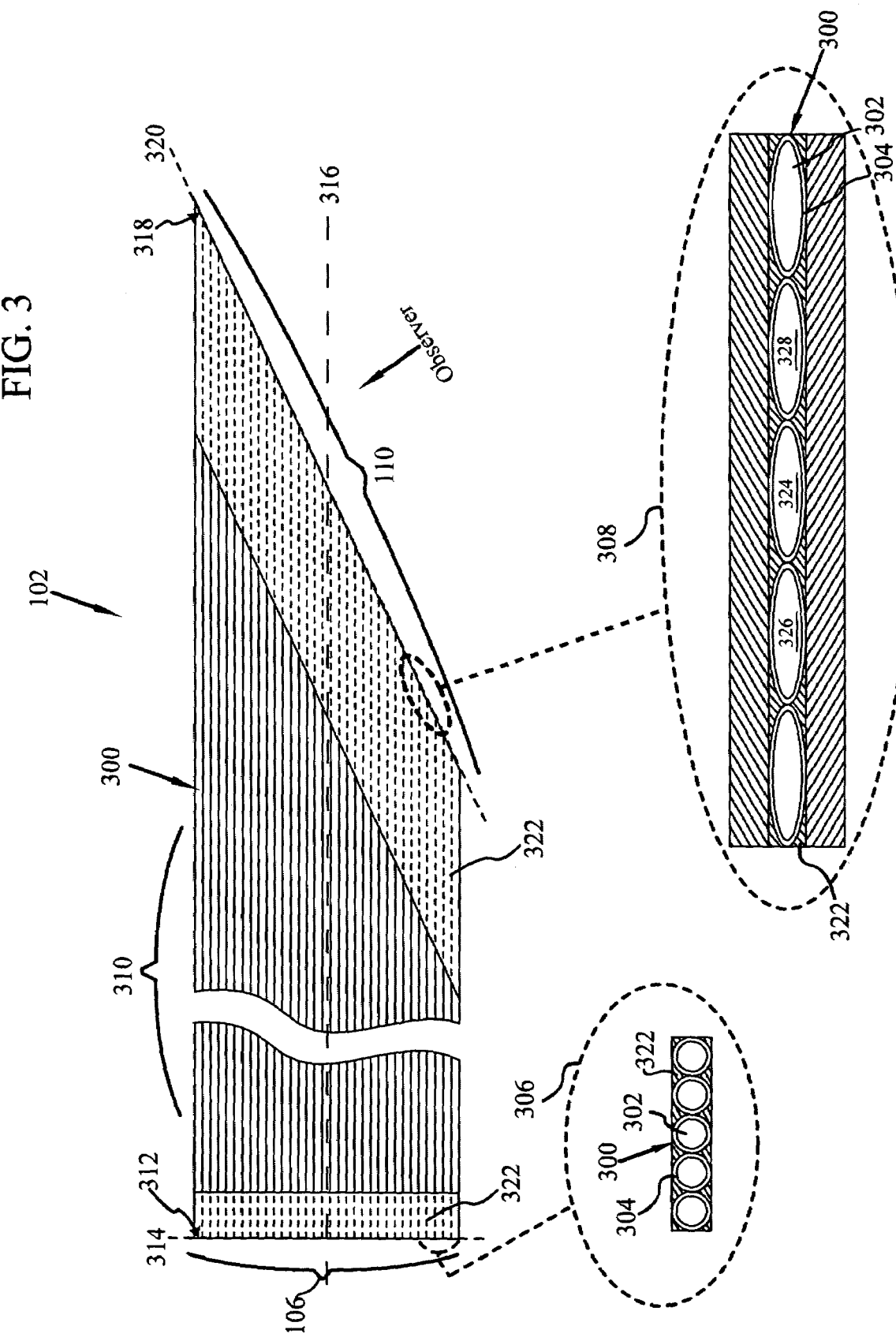
FIG. 3 is a plane view of a light guide layer.

FIG. 3 illustrates an exemplary light guide layer 102, established with a plurality of light guides 300. As shown, there are thirty-three light guides 300 for ease of discussion and conceptualization. Embodiments may employ more or fewer light guides 300. It is understood and appreciated that each light guide 300 has a longitudinal light guide core 302 and an external circumferential cladding 304, as shown in the enlarged input end view portion bounded by dotted line 306 and enlarged output end view portion bounded by dotted line 308. The core 302 has an index of refraction n1, and the clad 304 has an index of refraction n2, wherein n1>n2. In at least one embodiment, each light guide 300 has a flexible midsection 310.

With respect to FIG. 3, the plurality of input ends 312 of light guides 300 are aligned and, in at least one embodiment, define a portion of dotted line 314. It is this portion of line 314 that serves as input location 106 of each light guide layer 102. In addition, in at least one embodiment, this portion of line 314 is angled relative to a longitudinal centerline 316. In at least one embodiment this portion of line 314 is perpendicular to a longitudinal centerline 316. When the light guide layers 102 are stacked, the aligned input locations 106 provide input face 112. (see FIG. 1)

The portion of line 320 defined by output ends 318 is usually not perpendicular to longitudinal centerline 316. More specifically, the dotted line 320 as defined by output ends 318 is usually angled relative to longitudinal centerline 316. A portion of line 320 defines the output location 110 for light guide layer 102.

In at least one embodiment, the plurality of output ends 318 of the light guides 300 within a given light guide layer 102 are aligned in substantially contiguous parallel contact, without intervening spacers or material separating each individual output end 318 from its neighbors on either side. In other words, the output ends 318 lie next to one another and are in actual contact, touching along their outer surfaces at one or more points, as illustrated in the enlarged end view bounded by dotted line 308, showing light guide 324 touching light guide 326 to the left and light guide 328 to the right. More specifically, the clad 304 of one light guide 300 is in physical contact with the clad 304 of at least one other light guide 300.

It is understood and appreciated that the cores 302 of each light guide 300 are not in contact; rather, the outer surfaces of the clad 304 about the circumference of cores 302 are in contact. Moreover, over the course of each entire length, the core 302 of one light guide 300 will not contact the core 302 of another light guide 300. Bonding material 322 bonds the aligned input ends 312 as a collective input group, and the aligned output ends 318 as a collective output group.

With respect to the high-level overview presented by the flowchart of FIG. 2, there are at least two different sub-methods that may be employed. In one, all light guide layers are stacked before the alignment is checked and adjustments for misalignment performed. In another other, alignment and adjustment efforts are performed as each light guide layer is added to the stack. In yet another, multiple light guide layers may be added at one time and then aligned before additional light guide layers are added to the aligned set.

Figure 4:
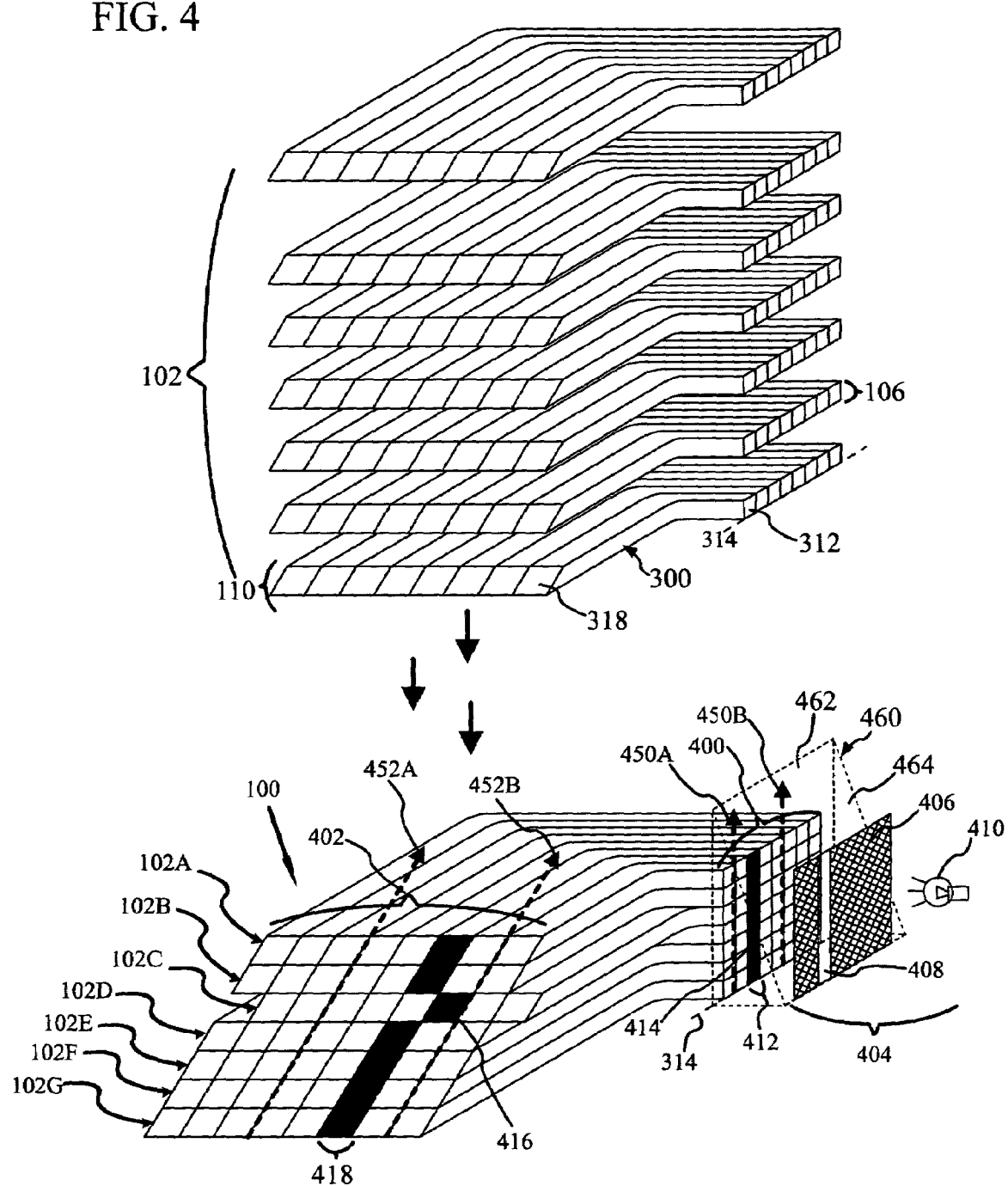
FIG. 4 is a concept drawing showing an embodiment of a fabrication alignment technique.

FIG. 4 conceptually illustrates an embodiment wherein the light guide layers 102 are provided, stacked, and then aligned. For ease of discussion and illustration, only seven light guide layers 102 are shown. Further, the light guides are conceptually illustrated with rectangular cross sections and without attempt to show bonding materials or inter-layer spacers as may be employed. In at least one embodiment the light guide layers 102 are as described above.

The use of alignment pins, gigs or physical guides may be employed to aid in establishing an input reference plane as an aid in establishing the input face 400. More specifically, in at least one embodiment the reference plane is established with mechanical means such as a sheet of optically clear acrylic with a supporting sides and base, shown in dotted relief as jig 460. As illustrated, jig 460, provides a flat, transparent reference surface 462 that is maintained in a fixed orientation by at least one side support 464. Transparent reference surface 462 provides the reference plane. A transparent block, or opaque sheet of material that contains one or more cutouts to allow the passage of light to selected vertically aligned input ends may also be used.

The input reference plane is usually setup to be perpendicular to line 314 defined by the input ends 312 of the initial light guide layer 102G as shown. Moreover, the reference plane is perpendicular to the horizontal plane defined by the input ends 312 of the light guide layer 102. The first light layer is shown as light guide layer 102G in FIG. 4. Also shown in FIG. 4 are two input reference lines 450A and 450B lines that lie in the perpendicular reference plane, or reference gig 460 as shown.

In at least one embodiment, the input reference lines 450A, 450B are chosen to be parallel to each other and perpendicular to the plane of the first light guide layer proximate to the input line 314. Similarly, the use of alignment pins, gigs or physical guides (not shown) may be employed to establish an output reference plane as an aid in establishing the output face 402.

Two output reference lines 452A and 452B in the output plane established by the output face 402 are shown. The light guide layers 102 are stacked with their input ends 312 against the reference jig 460 input face 400. Moreover, the input ends 312 are vertically aligned along reference lines 450A, 450B. All lateral displacement of the input ends of the light guide layers are then measured with respect to the input-end reference lines 450A or 450B.

Likewise, in at least one embodiment, the output ends 318 of the light guide layers 102 are stacked against a reference jig (not shown), providing a reference plane to establish the output face 402. Moreover, the output ends are vertically aligned along reference liens 452A, 425B. All lateral displacement of the output ends of the light guide layers are then measured with respect to the output reference lines 452A or 452B. As such, misalignment between the very first and the second light guide layers 102 will be detected and corrected.

This initial vertical alignment of the input ends and output ends is considered rough initial alignment. It is of often desired to make the attempt to provide close relative alignment between the input ends and the output ends so as to minimize the adjustment procedures. Further, in at least one embodiment, the initial alignment of the output ends 318 for the output face 402 is made with respect to the input ends 312 for the input face 400, and or vis-a-versa. As illustrated and discussed below, if either or both the input ends 312 and output ends 318 are misaligned with respect to each other, it is likely that the resulting image will be distorted. However, it is also to be realized that if the input ends 312 and output ends 418 have matching misalignment, the image will not be distorted.

In alternative embodiments, the reference lines 450 or 452 may be angled with respect to the plane of the first light guide layer 102G. In alternative embodiments, one or both of the reference planes are curved surfaces. In another embodiment the reference lines are physical markers on the reference surfaces or physical wires strung over the cutouts of the reference surfaces.

As stated above, in at least one embodiment, the light guide layers are stacked along the input reference lines 450 and the output reference lines 452. All orientations are then made with respect to the reference lines 450 and 452. In the ensuing description the vertical direction for the input face refers to the direction parallel to the reference line 450A or 450B. Likewise, the vertical direction of the output face refers to the direction parallel to the reference line 452A or 452B. As such, vertical misalignment between the very first and the second light guide layers 102 will also be detected and corrected.

As shown, in at least one embodiment, the established input face 400 and output face 402 each lie within respective planes (i.e. no light guide layer 102 either extends beyond or falls short of a common plane defining the input face 400 or the output face 402 respectively). The alignment to establish the planar surface of the input face 400 and the output face 402 is generally more forgiving then the vertical alignment between the layers.

In at least one embodiment, an incident of misalignment between the light guide layers 102 is revealed with the use of a linear light source, as shown conceptually in FIG. 4. More specifically, a linear light source 404, such as for example a screen 406 providing a vertical aperture 408 (such as a slit) and light 410, is positioned proximate to the input face 400. Vertical aperture 408 is appropriately structured and arranged so as to provide light to a selected linear plurality of single input ends 412. Alternatively light source 404 includes a focusing lens, not shown, positioned between screen 406 and input face 400 to project an image of the vertical aperture 408 onto a selected linear plurality of single input ends 412 on the input face 400.

Linear light source 404 provides a linear image (e.g., a band of light illustrated as solid line 414) that is perpendicular to the light guide layers 102. Such a perpendicular alignment facilitates precise selection of a linear plurality of single input ends. It is of course understood and appreciated that alternative linear light sources may be used, such as for example a linear array of LEDs, a scanning laser bean or other appropriate device for imparting light to selected vertically aligned input ends.

As shown, a vertical column of input ends 412 is receiving light from the linear light source 404. The received light is transmitted through the light guides and provided to the corresponding output ends of the illuminated light guides. The linear band of light 414 provided upon the input face 400 now illuminates the occurrence of misalignment with respect to light guide layer 102C. Specifically as shown, light guide layer 102C is shifted one pixel to the right such that the light emitting output end 416 is not in vertical alignment with the other aligned light emitting output ends 418.

Figure 5:
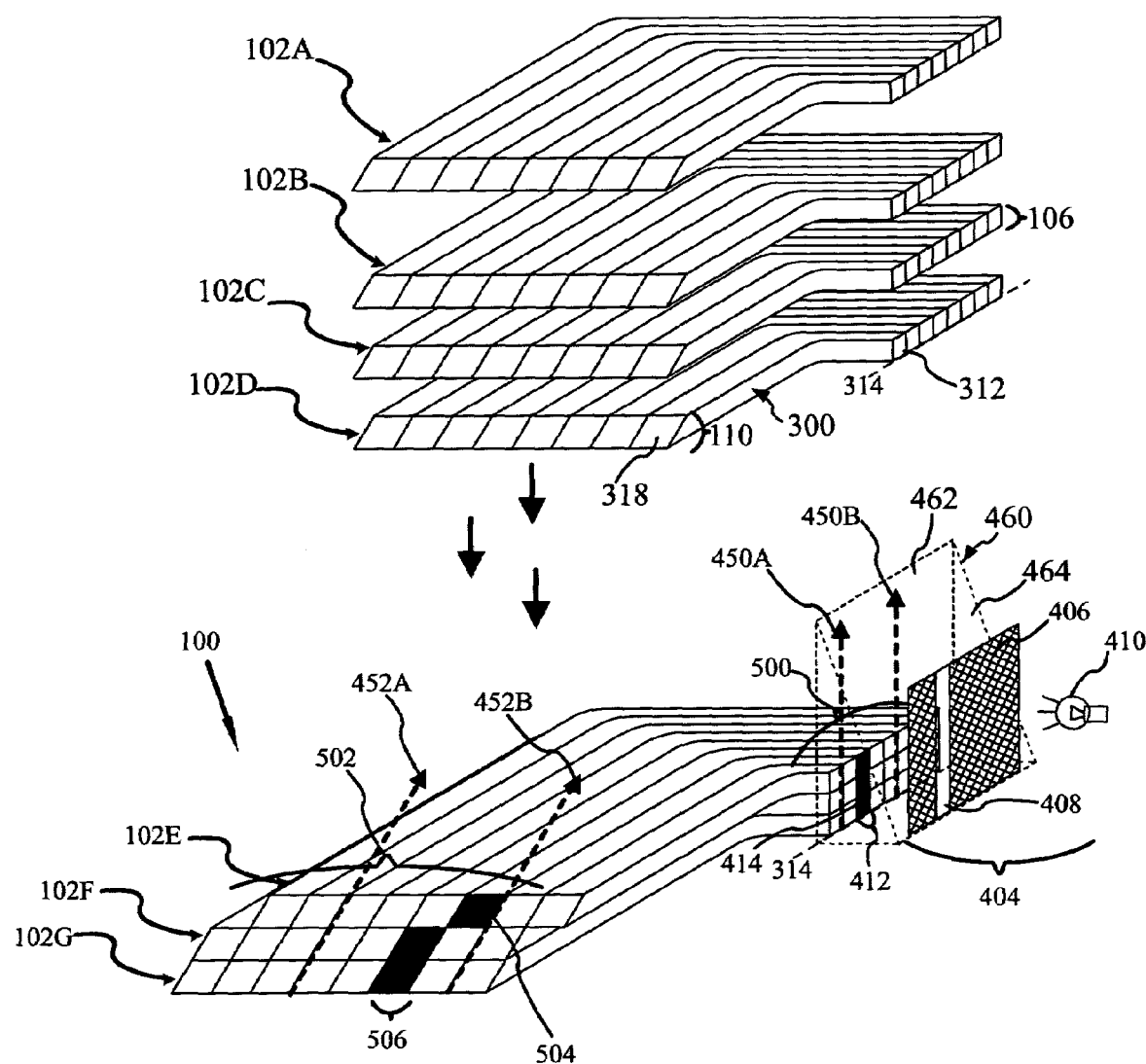
FIG. 5 is a concept drawing showing an alternative embodiment of a fabrication alignment technique.

FIG. 5 conceptually illustrates an embodiment wherein the light guide layers 102 are provided and aligned as they are stacked. For ease of discussion and illustration, as in FIG. 4, only seven light guide layers 102A~G are shown.

As in FIG. 4, the input locations 106 are vertically aligned along the input reference line 450A or 450B by the stacking process to provide a developing input face 500. The output locations 110 are likewise vertically aligned along the output reference line 452A or 452B to provide a developing output face 502. As discussed above with respect to FIG. 4, in at least one embodiment, use of alignment pins, physical guides, or jig 460 may be employed by the fabricating technician to aid in establishing the proper surface of the input face 500 and output face 502.

An incident of misalignment during the stacking process is revealed in one embodiment with the use of a linear light source 404, as described above. The linear light source 404 provides light to at least one input end 412.

As shown in FIG. 5, linear light source 404 is providing a linear band of light 414 upon three light guide layers 102G, 102F, 102E. The misalignment of light guide layer 102E is apparent and may thus be corrected. Specifically as shown, light guide layer 102E is shifted one pixel to the right such that the light emitting output end 504 is not in vertical alignment with the other aligned light emitting output ends 506.

With respect to FIGS. 4 and 5, as illustrated the misalignment has occurred at the output location 110 of a particular light guide layer 102. It is understood and appreciated that misalignment can occur at either the input location 106, the output location 110 or both the input and output locations. By providing a linear light source across a selected linear plurality of single input ends, the actual location of the misalignment is substantially immaterial.

Figure 6:
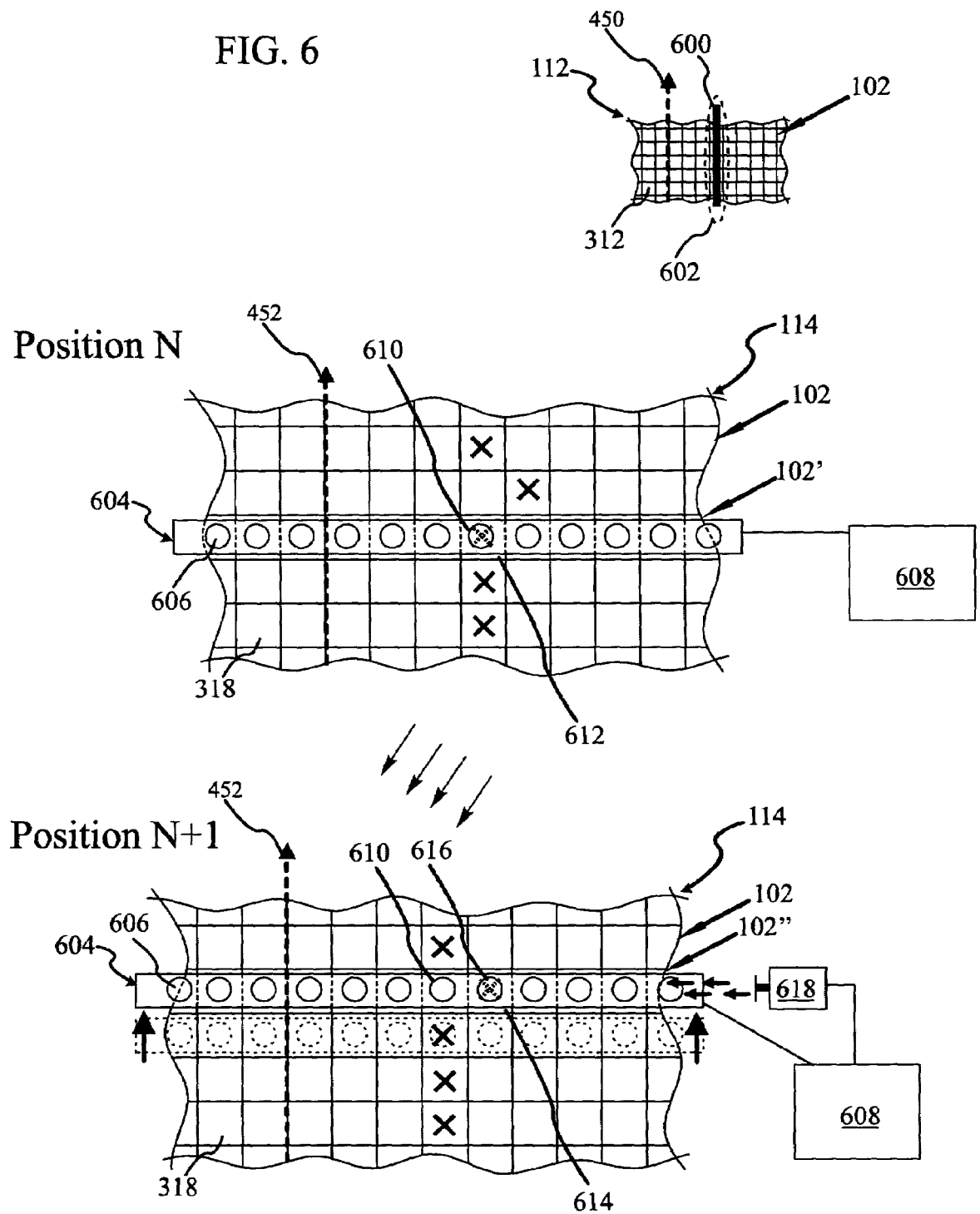
FIG. 6 provides enlarged portions of the input face and output face of a light guide screen to further illustrate a fabrication alignment technique.
Figure 7:
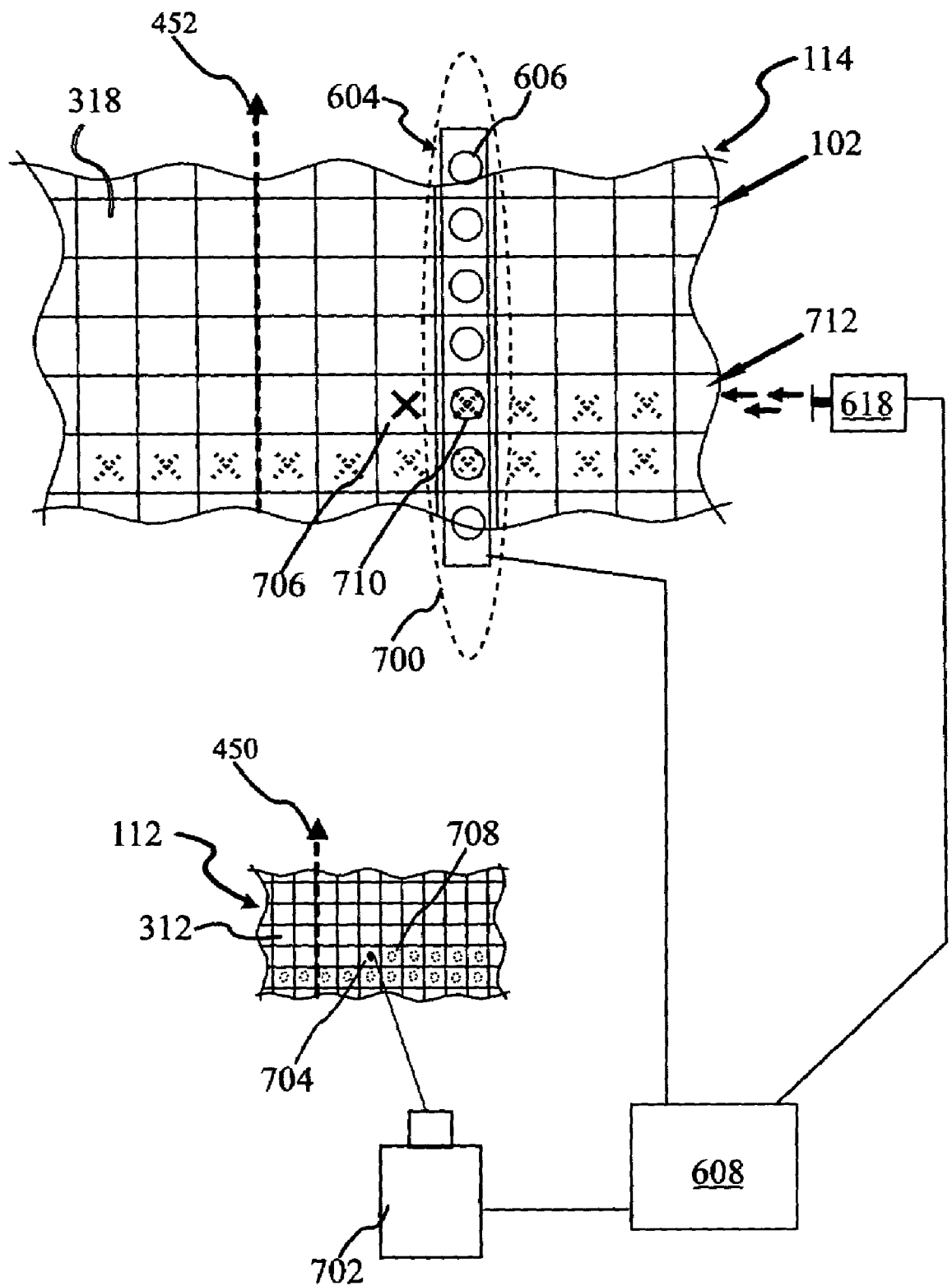
FIG. 7 provides enlarged portions of the input face and output face of a light guide screen to further illustrate an alternative fabrication alignment technique.

Correction of detected misalignment is more fully described and appreciated with respect to FIGS. 6 and 7. Shown in FIG. 6 is an enlarged partial section of input face 112 and an enlarged partial section of output face 114. A linear light source such as that shown in FIGS. 4 and 5 as linear light source 404, provides band of light 600 to a selected linear plurality of single input ends 602, bounded in FIG. 6 by a dotted line. As shown, the band of light 600 is perpendicular to the plurality of stacked light guide layers 102. In addition, band of light 600 is no wider than a single input end 312.

As shown in FIG. 6 the band of light 600 is applied to a single column of vertically aligned input ends 602. In at least one alternative embodiment the band of light 600 is applied to more than a vertically aligned column of input ends that is more than one input end 312 wide. In another alternative embodiment, multiple bands of light 600 may be applied to multiple selected linear pluralities of input ends, such as for example one being proximate to the left side of the input face 112 and one being proximate to the center of the input face 112. In yet another embodiment a plurality of spaced bands of light 600 of equal or varying width may be applied.

Light received by the input ends 312 of the selected linear plurality of single input ends 602 is transmitted to the corresponding output end 318 of each selected light guide. The output light is represented as an "X" in the enlarged partial section of output face 114.

A light detector 604 is provided adjacent to the output face 114. In at least one embodiment, light detector 604 is a linear light detector. Light detector 604 includes a plurality of linearly aligned photo detectors 606, each photo detector having a diameter smaller than each output end 318. Photo detectors 606 may be photoresistors, photovoltaic cells, photodiodes, phototubes, CCD sensors, CMOS sensors or other devices which are operable to detect the presence of light. In at least one embodiment, photo detectors 606 are photoresistors.

Further, in at least one embodiment, light detector 604 is at least as long as the output location 110 of each light guide layer 102, see FIGS. 1 and 3. In an alternative embodiment, light detector 604 is shorter in length then the output location 110 of each light guide layer. As light detector 604 is moved substantially along only a vertical axis adjacent to the output locations 110, use of a short light detector 604 is not detrimental. In at least one embodiment, the vertical axis of movement is along vertical reference line 452.

Returning to FIG. 6, the light detector 604 is provided adjacent to the output ends of a first selected light guide layer 102'. As illustrated, the light detector 604 is parallel to the light guide layers 102. In at least one embodiment, a controller 608 capable of directing the operation of light detector 604, and potentially other systems as well, is provided and electrically coupled to at least the light detector 604, and potentially the light source 404 and/or other devices.

In at least one embodiment, the controller 608 is also capable of driving small actuators 618 capable of horizontally adjusting the physical position of a selected light guide layer 102. More specifically, the horizontal adjustment of a selected light guide layer 102 is along an axis that is transverse to vertical reference lines 450 (in the case of horizontal adjustment performed upon the input face 112, or transverse to vertical reference line 452, in the case of horizontal adjustment performed upon the output face 114. A suitable controller 608 may include analog circuitry, a digital processor, a CPU programmed with control logic, a device driver and combinations thereof. Under appropriate circumstances, the controller 608, or portions of the controller 608, may be integrated with light detector 604.

Electrically coupled to controller 608, a photo detector 610 in light detector 604 detects light at a first output end 612 providing light. As the photo detectors 606 are fixed at known intervals in light detector 604, a precise location of the light emitting output end may be determined by controller 608. In at least one embodiment, the intensity of the emitted light detected is also determined by controller 608.

Light detector 604 is then moved vertically to be adjacent to the output ends of a second selected light guide layer 102". In at least one embodiment, such vertical movement of light detector 604 is accomplished with mechanical guides so as to insure precise vertical movement without unintended horizontal movement.

Positioned adjacent to the second selected light guide layer 102", the presence of light provided by a second output end 614 is detected by photo detector 616 and the location of the second light guide output end 614 calculated. The first and second output locations (i.e., of output ends 612, 614) are compared to determine either proper alignment or misalignment. For example, in at least one embodiment, a comparison of the intensity of emitted light is also compared as part of the misalignment evaluation process.

Moreover, in at least one embodiment the light detector 604 is sequentially aligned to each light guide layer 102, and the location of the output end providing light (i.e., output end 612 or 614) is recorded for each light guide layer. The recorded locations are compared to determine the presence of vertical misalignment. In response to the determination of vertical misalignment, the horizontal alignment of at least one light guide layer 102 is adjusted.

In at least one embodiment, the initially aligned input locations 106 of the light guide layers 102 are clamped and/or bonded during the fabrication stacking process. The output locations 110 are left free, such that any desired horizontal adjustment may be performed at the output location 110. In at least one alternative embodiment, the initially aligned output locations 110 are clamped and/or bonded during the fabrication stacking process. The input locations 106 are left free, such that any desired horizontal adjustment may be performed at the input location 106.

With respect to FIG. 6, when light detector 604 is moved from light guide layer 102', having output end 612 providing light detected by photo detector 610, to light guide layer 102", having output end 614 providing light detected by photo detector 616, the illustrated error in offset will be detected. By horizontally adjusting light guide layer 102" to the left, relative vertical alignment between the input location 106 and the output location 110 is provided.

As controller 608 is operable to determine output end 614 as physically to the right of output end 612, controller 608 is operable to direct horizontal adjustment to the left for light guide layer 102". In at least one embodiment, such horizontal adjustment is accomplished by activating actuator 618 to drive light guide layer 102" to the left.

With respect to the photo detectors 606, for ease of discussion and illustration, a single photo detector has been illustrated corresponding to each output end 318. In at least one embodiment, the photo detectors 606 are about one-tenth the size of each output end 318. As such, multiple photo detectors 606 will align to each output end 318. Detecting light with a plurality of photo detectors 606 permits greater resolution in detecting minute misalignment.

Such greater resolution in the detection of misalignment advantageously permits greater precision in both the detection of misalignment and the correction of misalignment. More specifically, in an embodiment utilizing ten photo detectors 606 per output end 318, a detected misalignment of between about one and two photo detectors 606 may not be considered as requiring horizontal adjustment of the light guide layer 102.

It is understood and appreciated that the alignment technique illustrated may be performed in one embodiment to check alignment as each light guide layer is stacked to provide an LGS 100 having a selected number of aligned light guide layers. When deemed necessary in response to the detection of misalignment, alignment may be adjusted during the stacking process. The alignment technique as illustrated may also be performed to check and adjust the horizontal alignment of the light guide layers 102 after the light guide layers 102 have been stacked.

As indicated above, in at least one alternative embodiment a plurality of bands of light 600 are used. In one embodiment, the plurality of bands of light 600 are arranged in a specific pattern, such as for example a bar code pattern. The pattern for the light guide layer 102 being added is isolated and analyzed. Mathematical techniques such as across correlation are used to compare the isolated pattern to the aligned pattern. An offset, if necessary, is then computed and the layer shifted to minimize the offset. A similar process may also be used when light guide layers 102 are either all stacked or stacked in groups before alignment is checked. In such a case, incidence of misalignment is isolated, extracted and analyzed to determine the proper horizontal adjustment.

In at least one embodiment, the use of multiple bands of light 600 may advantageously increase the signal to noise ratio of the photo detector signals, thereby improving the accuracy of the alignment. In addition, although the width of the light band 600 is preferred for certain embodiment to be about one input end 312 wide, the width of light band 600 on the input face 112 may be larger than one input end 314 in other embodiments. Where a light band 600 wider than an input end 314 is employed (i.e. light band 600 overlaps input ends 314), the intensity of the light detected at the corresponding output ends 318 is evaluated. The centroid of the illuminated area as detected upon the output face 114 is then used to determine the position and alignment of the light guide layer 102.

Figure 8:
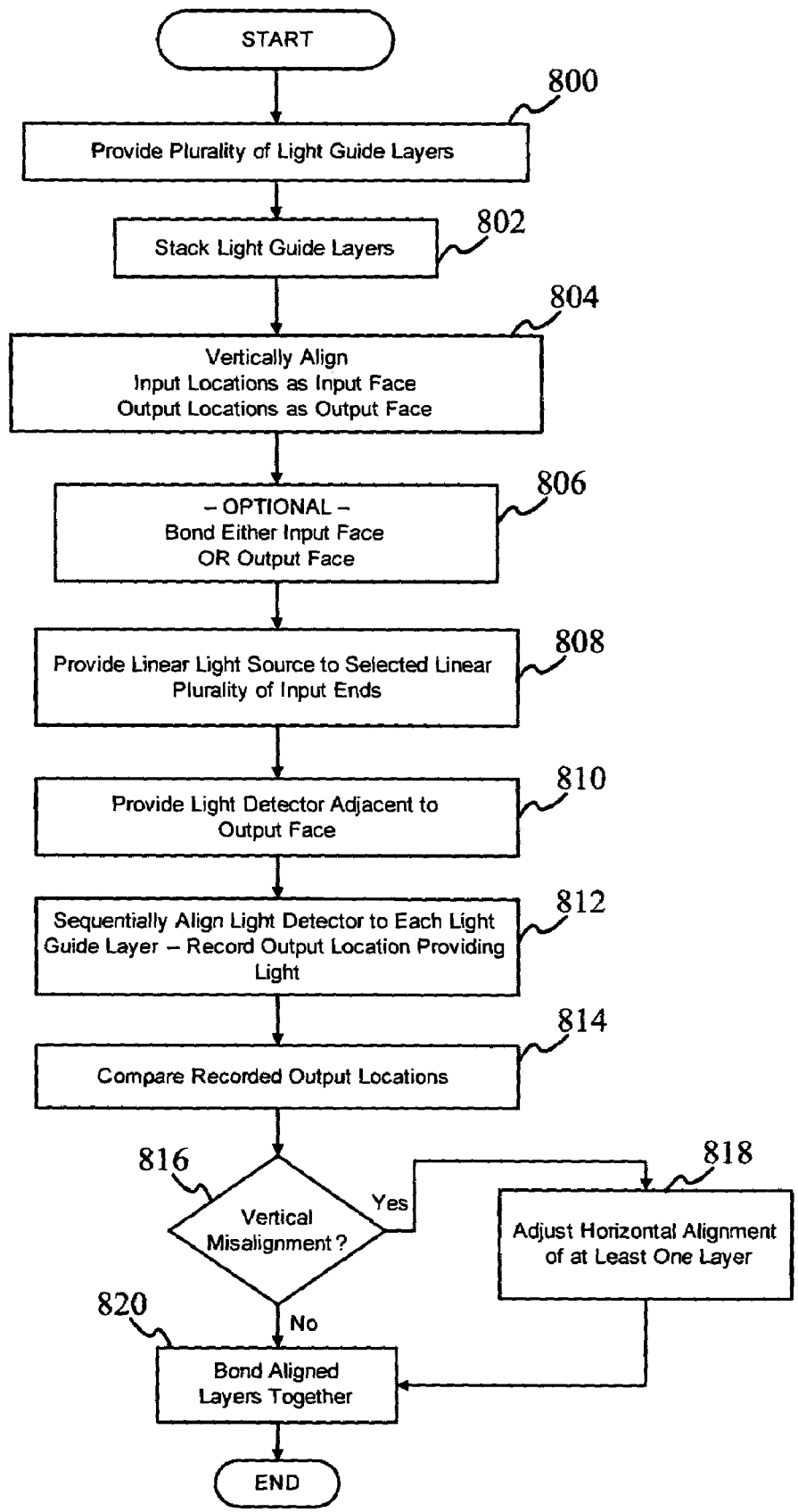
FIG. 8 is a flowchart summarizing the alignment techniques illustrated in FIGS. 4 through 6.

To summarize, the fabrication alignment technique for an LGS 100 as shown in FIGS. 4~6, may be summarized as shown in the flowchart of FIG. 8. Specifically, the process commences by providing a plurality of light guide layers 102 as describe above, block 800. The light guide layers 102 are stacked, block 802. As the light guide layers are stacked, they are initially vertically aligned, block 804. The stacked light guide layers 102 provide at least a portion of an input face 112 and an output face 114. As the stacking process is performed, the layers may be bonded together at either the input face 112 or the output face 114, block 806.

A linear light source 404 is provided to a selected linearly plurality of single input ends, block 808. The linear light source 404 is perpendicular to stacked light guide layers 102. A light detector 604 is provided adjacent to the output face 114, block 810. The light detector 604 is parallel to the light guide layers 102. The light detector 604 is sequentially aligned to each light guide layer 102. Movement of the light detector 604 is performed with respect to the input reference line 450, as the input reference line 450 relates to the output face 114. For each light guide layer 102, the location of an output end providing light is recorded, block 812.

The location values are compared, block 814, to determine the occurrence of vertical misalignment, decision 816. Upon the evaluation of vertical misalignment, the horizontal alignment of at least one light guide layer 102 is adjusted, block 818. When proper alignment is established the aligned ends are bonded together, block 820

The process as set forth in the flowchart of FIG. 8 may be performed upon a stacked set of light guide layers 102 providing LGS 100, or as each light guide layer 102 is added to provide an LGS 100. Upon the completion of the alignment technique, the relative vertical alignment between the input ends and the output ends is made substantially permanent by bonding the previously un-bonded ends of the light guide layers 102 together at either the input locations or the output locations.

The checking of vertical alignment between a selected linear plurality of single input ends may also be performed for another selected linearly plurality of single input ends.

Such redundant checking may be performed contemporaneously or sequentially depending upon the preferences of the fabrication operator.

FIG. 7 is an enlarged partial section of output face 114 and an enlarged partial section of input face 112, substantially identical to the enlarged portions shown in FIG. 6. In this embodiment of the fabrication alignment, the light detector 604 is provided adjacent to the output face 114. Light detector 604 is positioned to be adjacent to a selected linear plurality of single output ends, identified by dotted line 700. As shown, light detector 604 is oriented to be perpendicular to the stacked light guide layers 102. In addition, in at least one embodiment, the photo detectors 606 of light detector 604 are provided in a column no wider than a single output end 318, as shown. In an alternative embodiment, not shown, light detector 604 is wider than a single output end 318.

In contrast to the method described with respect to FIG. 6, the light detector 604 does not move; rather, light is sequentially provided by a light source 702 to each input end 312 in each light guide layer 102. Such a light source 702 may be, for example, a scanning laser, TIs DLP™ projection engine or other device capable of providing light to a specific known location. The location of each input end 312 is recorded by controller 608 as light is provided to each input end 312 by the light source 702.

When light is detected by light detector 604, the relative location of the output end 318 is compared to the known input end 312 location. As such, the input end 312 locations of each light guide layer 102 may be compared to determine the occurrence of any misalignment. As each input location is tracked, in an instance of misalignment, the location of an input end falling ahead or behind the expected location determines the direction of horizontal adjustment.

As shown, light source 702 is providing light to input end 704, located in the second row from the bottom and sixth from the right in partial input face 112. Light, illustrated as a solid "X" is being emitted from output end 706, located in the second row from the bottom and fifth from the right in partial output face 114. More specifically, when light provided to another input end 708 is detected by photo detector 710, controller 608 determines a misalignment for a related light guide layer 712. Controller 608 may then activate actuator 618 to adjust the horizontal position of the related light guide layer 712.

Figure 9:
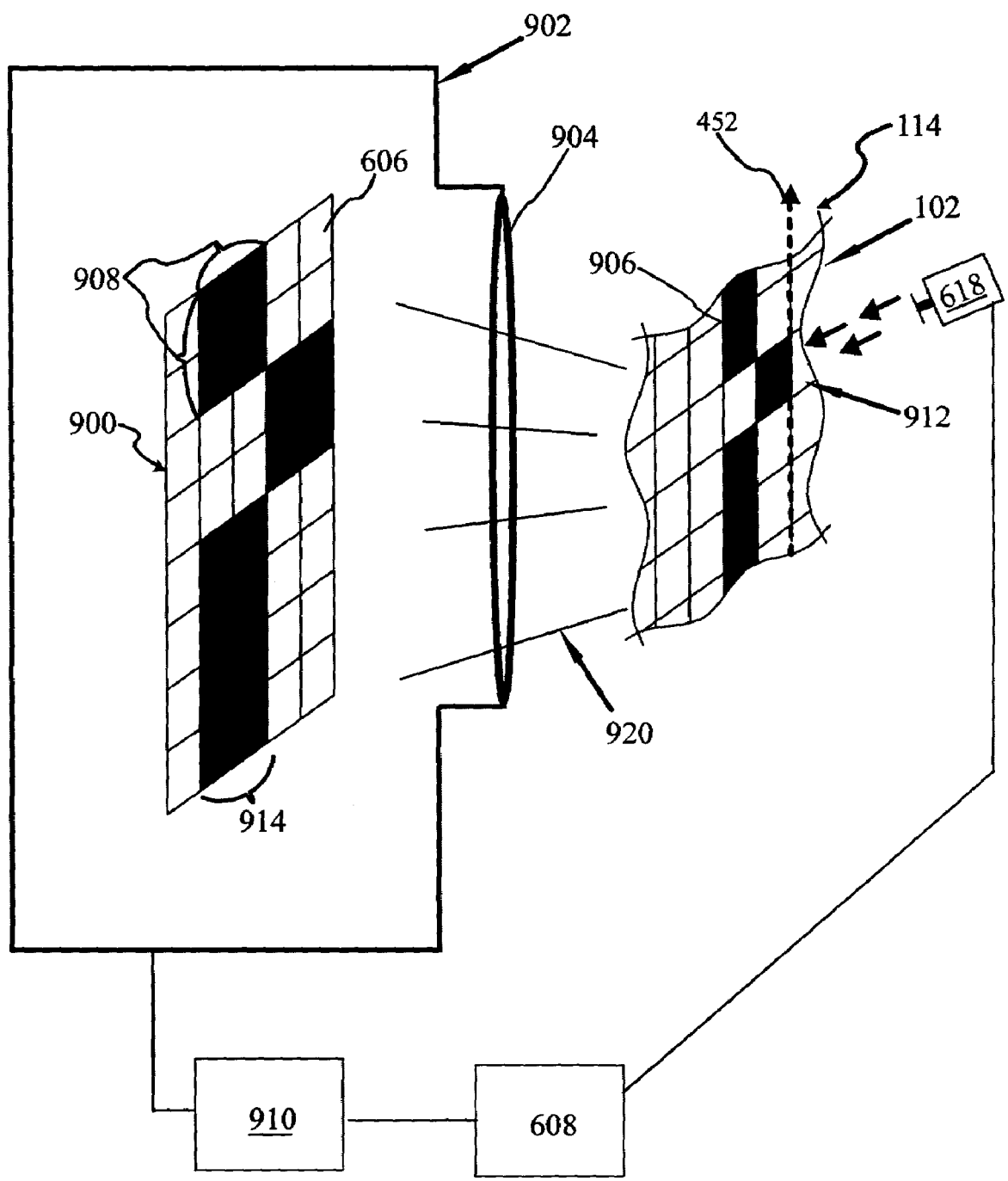
FIG. 9 provides an enlarged portion of the output face of a light guide screen and a two-dimensional array light detector to further illustrate yet another alternative fabrication technique.

It is also understood and appreciated that light detector 604 is not limited to linear arrays. In at least one alternative embodiment, a two-dimensional array light detector 900 (hereinafter 2-D array light detector 900) of photo detectors 606 is used as shown in FIG. 9. An example of a commercially available 2-D array light detector 900 that may be adapted for use in at least one alignment technique is the CCD or CMOS sensor arrays used in digital video cameras, such as digital video camera 902. As a partial perspective view, FIG. 9 illustrates a portion of output face 114, the 2-D array light detector 900, the light 920 emanating from the output face, and the light 920 entering digital camera 902 to strike the 2-D array light detector 900.

In an embodiment utilizing a 2-D array light detector 900, controller 608 analyzes the signals of the 2-D array light detector 900 to detect misalignment of the light guide layers 102. In at least one embodiment, the 2-D array light detector 900 is disposed proximate to the output face 114.

In alternative embodiments, light detectors 604 and 2-D array light detector 900 respectively are positioned at some distance from the output face 114 with at least one imaging lens 904 (as shown in FIG. 9) disposed between the 2-D array light detector 900 and the output face 114. Lens 904 is used to form an image of the form an image of the pattern emanating from the output ends 318 onto 2-D array light detector 900. Lens 904 may be an integral component of digital video camera 902.

Although there may be a one to one correlation between output ends 318 and the photo detectors 606 of the 2-D array light detector 900, in at least one embodiment, a magnified image of the output ends 314 is provided to a plurality of photo detectors 606. For example a single output end 906 is magnified to occupy a 2×2 set 908 of photo detectors 606 as shown in FIG. 9.

The received pattern is then analyzed in real time with an image processor 910 to determine the relative misalignment between the output ends 318 and the input ends (not shown). As shown, light guide layer 912 is misaligned such that the vertical band 914 of detected light is disrupted.

In at least one embodiment, the video capture apparatus, such as digital video camera 902 is repositioned in synchronous harmony with the stacking and aligning of the light guide layers 102 such that the illuminated output end 318 of the light guide layer 102 just added to the stack is about centered in the field of view of digital video camera 902. So as to maximize the accuracy of alignment detection, motion of the digital video camera 902 is typically limited to a single axis. In at least one embodiment this single axis is transverse to the stacked light guide layers 102.

As described above with respect to FIGS. 6 and 7, in response to the determination of a misalignment, controller 608 directs actuator 618 to adjust the horizontal alignment of at least one light guide layer 102.

Figure 10:
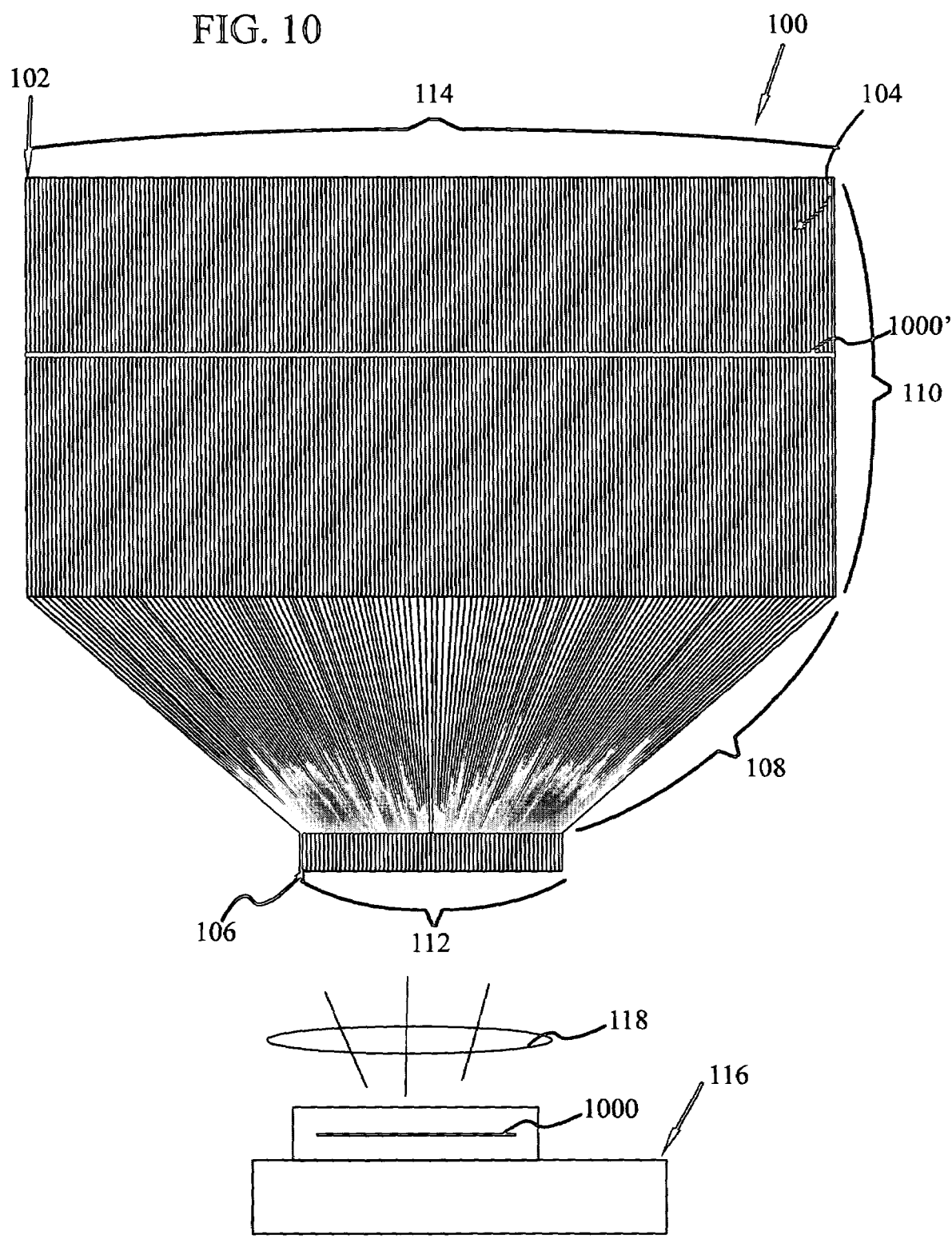
FIG. 10 is a schematic diagram of a light guide screen with proper alignment provided by at least one embodiment of the fabrication alignment technique.

FIG. 10 illustrates a complete and properly aligned LGS 100. As shown, horizontal image 1000 provided by image source 116 provides a uniform and undistorted horizontal image 1000' upon output face 114. It is of course understood and appreciated that the terms "horizontal" and "vertical" as used herein relate to the figures as illustrated.

Changes in orientation of the input face 112 and/or the output face 114 from the orientations depicted are not unexpected, and as such, the terms horizontal and vertical are not viewed as terms of limitation; rather, as terms of helpful description with respect to the embodiments herein described.

Changes may be made in the above methods, systems and structures without departing from the scope thereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A fabrication alignment technique for a light guide screen, comprising:
   providing a plurality of light guide layers, each layer including;
      a plurality of aligned light guides, each light guide having an input end, a midsection and an output end;
   stacking the light guide layers;
   vertically aligning the input ends and the output ends;
   optically detecting vertical misalignment; and
   adjusting horizontal alignment of at least one light guide layer in response to the detection of vertical misalignment.

2. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends;
optically detecting vertical misalignment, wherein detecting vertical misalignment comprises:
providing a linear light source to a selected linear plurality of single input ends, the linear light source oriented perpendicularly to the plurality of stacked layers;
providing a light detector adjacent to the output ends of a first selected light guide layer and recording a first output end location providing light;
moving the light detector adjacent to the output ends of a second selected light guide layer and recording a second output end location providing light; and
comparing the first and second output end locations; and
adjusting horizontal alignment of at least one light guide layer in response to the detection of vertical misalignment.

3. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends;
optically detecting vertical misalignment, wherein detecting vertical misalignment comprises:
providing a light detector adjacent to a selected linear plurality of single output ends, the light detector oriented perpendicularly to the plurality of stacked layers;
sequentially providing light to each input end of a light guide layer, and for each light guide layer:
recording the input end location when light is detected by the light detector at a corresponding output end aligned with the light detector; and
comparing the input end locations of each light guide layer; and
adjusting horizontal alignment of at least one light guide layer in response to the detection of vertical misalignment.

4. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends;
optically detecting vertical misalignment; and
adjusting horizontal alignment of at least one light guide layer in response to the detection of vertical misalignment, wherein the light guide layers are adjusted horizontally at the output location.

5. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends;
optically detecting vertical misalignment; and
adjusting horizontal alignment of at least one light guide layer in response to the detection of vertical misalignment, wherein the light guide layers are adjusted horizontally at the input location.

6. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends, wherein vertically aligning the input ends is with respect to the output ends
optically detecting vertical misalignment; and
adjusting horizontal alignment of at least one light guide layer in response to the detection of vertical misalignment.

7. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends;
optically detecting vertical misalignment,wherein optically detecting vertical misalignment comprises a linear light source provided to the aligned input ends and a two-dimensional array of photo detectors adjacent to the aligned output ends; and
adjusting horizontal alignment of at least one light guide layer in response to the detection of vertical misalignment.

8. The method of claim 7, further including at least one lens, structured and arranged to magnify a single output end to a plurality of photo detectors.

9. A fabrication alignment technique for a light guide screen, comprising:
providing a plurality of light guide layers, each layer including;
a plurality of aligned light guides, each light guide having an input end, a midsection and an output end;
stacking the light guide layers;
vertically aligning the input ends and the output ends;
optically detecting vertical misalignment, wherein optically detecting vertical misalignment comprises a linear light source provided to the aligned input ends and a linear array of photo detectors adjacent to the aligned output ends; and
adjusting horizontal alignment of at least one light guide layer in response to the detection of vertical misalignment.

10. The method of claim 9, wherein the photo detectors have a diameter smaller than each output end.

11. The method of claim 9, wherein the photodetectors have a diameter about one-tenth of an output end.

12. A fabrication alignment technique for a light guide screen, comprising:
providing a plurality of light guide layers, each layer including;

a plurality of aligned light guides, each light guide having an input end, a midsection and an output end;

stacking the light guide layers;

vertically aligning the input ends of each light guide layer as an input face and the output ends of each light guide layer as an output face;

providing a linear light source to a selected linear plurality of single input ends, the linear light source oriented perpendicularly to the plurality of stacked light guide layers;

providing a light detector adjacent to the output face, the light detector oriented parallel to the plurality of stacked light guide layers;

sequentially aligning the light detector with each light guide layer and recording an output end location providing light for each light guide layer;

comparing the recorded output end locations of each light guide layer to determine vertical misalignment; and adjusting horizontal alignment of at least one light guide layer in response to the determination of vertical misalignment.

13. The method of claim 12, wherein the adjustment provides relative vertical alignment between the input ends and the output ends.

14. The method of claim 12, wherein the light guide layers are adjusted horizontally at the output location.

15. The method of claim 12, wherein the light guide layers are adjusted horizontally at the input location.

16. The method of claim 12, wherein either the input face or the output face is bonded together to provide a bonded face and an un-bonded face before an adjustment of horizontal alignment is performed, the adjustment performed upon the un-bonded face.

17. The method of claim 12, wherein the midsections of the light guides are flexible, thereby permitting independent orientation of the output ends from the input ends of each light guide layer.

18. The method of claim 12, wherein the linear light source provides at least one linear image normal to the light guide layers.

19. The method of claim 12, wherein alignment is checked as each light guide layer is stacked.

20. The method of claim 12, wherein alignment is adjusted as each light guide layer is stacked.

21. The method of claim 12, wherein alignment is adjusted after the light guide layers are stacked.

22. The method of claim 12, wherein the technique is performed for another selected linear plurality of single input ends.

23. The method of claim 12, wherein the light detector includes a two-dimensional array of photo detectors.

24. The method of claim 23, further including at least one lens, structured and arranged to magnify and optically couple a single output end to a plurality of photo detectors.

25. The method of claim 12, wherein the light detector is a linear light detector.

26. The method of claim 25, wherein the light detector includes a plurality of linearly aligned photo detectors, each photo detector having a diameter smaller than each output end.

27. A fabrication alignment technique for a light guide screen, comprising:

providing a plurality of light guide layers, each layer including;

a plurality of aligned light guides, each light guide having an input end, a midsection and an output end;

stacking a first light guide layer upon a second light guide layer;

vertically aligning the input ends and the output ends of the stacked layers;

providing a light source to two selected, vertically aligned input ends;

providing a light detector adjacent to the first light guide layer and recording a first output end location providing light;

moving the light detector adjacent to the second light guide layer and recording a second output end location providing light;

comparing the recorded first output end location to the second output end location to determine vertical misalignment;

adjusting horizontal alignment of the first light guide layer in response to the determination of vertical misalignment; and repeating the technique with additional light guide layers to provide a light guide screen having a selected number of aligned light guide layers.

28. The method of claim 27, wherein adjusting provides relative vertical alignment between the input ends and the output ends.

29. The method of claim 27, wherein vertically aligning the input ends is with respect to the output ends.

30. The method of claim 27, wherein the light guide layers are adjusted horizontally at the output location.

31. The method of claim 27, wherein the light guide layers are adjusted horizontally at the input location.

32. The method of claim 27, wherein the light detector includes a two-dimensional array of photo detectors.

33. The method of claim 32, further including at least one lens, structured and arranged to magnify and optically couple a single output end to a plurality of photo detectors.

34. The method of claim 27, wherein the light detector is a linear light detector.

35. The method of claim 34, wherein the light detector includes a plurality of linearly aligned photo detectors, each photo detector having a diameter smaller than each output end.

* * * * *